Patented Nov. 30, 1943

2,335,373

UNITED STATES PATENT OFFICE 2,335,373

TREATING WET SOLIDS

Teynham Woodward, Los Altos, Calif., assignor to Westvaco Chlorine Products Corporation, New York, N. Y., a corporation of Delaware No Drawing. Application October 21, 1940, Serial No. 362,167

10 Claims. (Cl. 210—62)

This invention relates to treating wet solids; and it comprises an improved method of economically removing water from precipitates, suspensions and the like containing gypsum, or other solids, having a form or structure such that liquids tend to be entrapped or retained by the particles, wherein a wet slurry of gypsum or other material is subjected to a jarring or mild shattering action, advantageously in a hammer mill, to disaggregate the particles and is then filtered, advantageously under vacuum or pressure, to effect an improved separation of liquid from the solids prior to drying, and the solids are then dried by application of heat; the amount of heat required for the final drying being materially reduced, the reduction corresponding to the amount of liquid set free by the jarring or milling treatment and removed during said filtration; all as more fully hereinafter set forth and as claimed.

In chemical industries, solid particles made by crystallization, precipitation and similar procedures are usually produced under such conditions that they are initially wet with water or aqueous liquids. In order to obtain a dry product for storage, shipment or utilization, it is customary to remove the bulk of the liquid by filtration under vacuum or pressure, or both, followed by drying by application of heat. Generally, the wet solid is freed of most of the liquid by filtration, and the filter cake is then dried. Such methods frequently include a washing step to free the filter cake from the mother liquor prior to drying. Drying solids by heat is a rather expensive operation because of the high thermal requirements and it is desirable to remove as much of the water or liquid as possible prior to drying.

Unfortunately, the physical structure of the particles of many of these solids formed by precipitation, crystallization and the like is such as to limit the amount of liquid which can be removed from the filter cake by vacuum or pressure. In other words, operating in the ordinary and efficient ways there is, nevertheless, a large amount of liquid physically retained by the individual or clustered particles of the precipitate in the cake. This places an undesirably heavy load on the final drying operation. For example, calcium sulfate, in the form of the dihydrate or gypsum, is produced, usually as a byproduct, in a considerable variety of chemical processes. In general, the calcium sulfate is precipitated in a system containing enough water so that crystals of the dihydrate are formed. These have a well-known tendency to grow and to form aggregates. Individual crystals often have a twinned configuration; they represent doubly intergrown crystals. The individual gypsum particles produced have re-entrant surfaces giving a place where liquor can lodge. They frequently take the form of crystal nuclei surrounded by needle-like or acicular projections, a structure somewhat like that of a chestnut bur. Under some circumstances, the development of this structure can be inhibited or retarded, but this generally involves either the use of special equipment, or the addition to the system of special reagents to change the form of crystallization of the calcium sulfate. In most instances, both these expedients are undesirable and they always add to the cost.

Gypsum is most generally recovered from saline systems in which it has precipitated or crystallized with the stated "chestnut bur" structure. Such gypsum crystals tend to form aggregates which seem to be held together by rather strong attractive forces of some kind. When an aqueous slurry of gypsum crystals having this characteristic structure is filtered, and an attempt is made to remove water by blowing the filter cake, it is generally found that about 28 to 30 per cent of water (on the total weight) is retained. The porosity of the filter cake is very irregular. It appears that the open channels pocketed between the aggregates or clumps of crystals are much larger than the pores and crevices in the unit crystal masses themselves. Air tends to flow through these large channels displacing and evaporating water therefrom while leaving stagnant the water retained within the crystal aggregates.

In short, it is difficult, if not impossible, to obtain a gypsum filter cake containing even 3 pounds of dry gypsum for each pound of retained water, by blowing at atmospheric temperature. In order to obtain a dry final product it is therefore necessary to drive off, by application of heat, at least 1 pound of water for every 3 pounds of the final product.

Similar difficulties are encountered in attempting to recover numerous other chemical products in dry form, from aqueous slurries. For example, basic magnesium carbonate precipitates in a form similar to that described hereinabove for gypsum. Also, in precipitating magnesium hydroxide, and some of the artificial magnesium silicates, the desired final product is obtained in a form which retains considerable water after filtration and blowing—amounts on the order of 70 per cent, for example. In magnesium hydroxide and magnesium silicates, the structure of the precipitate appears to be different from that of precipitated gypsum, being more like a sponge than a chestnut bur. With precipitates of either form, it is difficult to reduce the water content by treatments at atmospheric temperatures, to such an extent that the final drying by application of heat is not a substantial element of the total cost of the recovered material.

It is an object achieved in the present invention to reduce the amount of liquid retained in solids of this character after ordinary physical methods of removal by suction, pressure blowing, and the like. This is accomplished by subjecting the wet slurry, prior to suction or pressure, to a jarring action, which is advantageously effected in a hammer mill. This apparently results in a mild disaggregation or separation of the aggregates of solid matter and the removal of projecting portions forming re-entrant surfaces so that water, or aqueous solutions, is not entrapped or retained to the usual undesirable extent. Pockets retaining liquid are removed. For example, the minimum water content present as physical liquid in precipitated gypsum with normal crystal growth, as obtained in various chemical processes, in the form of a filter cake which has been subjected to air blowing, is about 28 per cent. But I have found that the water content can be reduced to about 15 per cent or less, in air blowing the filter cake, if the slurry of the gypsum is preliminarily subjected to the action of a hammer mill. Similar beneficial results are obtained by similar treatments of other precipitates exhibiting an undesirable tendency to hold pocketed liquid when treated at atmospheric temperatures; such precipitates including basic magnesium carbonate, precipitated magnesium hydroxide, and magnesium silicate, as previously mentioned.

As stated hereinabove, especially beneficial effects are obtained when using a hammer mill for the jarring or shattering treatment. Hartshorn Patent 2,170,407 and Battey Patent 2,149,571 illustrate types of hammer mills that are useful in the practice of my invention and which give a mild jarring or shattering action so that the clumps of crystals of the material being treated are disaggregated without materially comminuting the constituent particles. Other types of mills may be employed, but I find that a hammer mill is generally most advantageous. A plate mill can be employed, but generally requires an excessive amount of maintenance and repair work in this service. A ball mill such as that illustrated in Hardinge Patent 1,355,474 or rod mill is not so effected in reducing moisture retention as a hammer mill. A hammer mill also has the advantage that power consumption is relatively small. Furthermore, the action of a hammer mill is exceptionally well adapted for the purpose of this invention, since the desideratum is a shattering or jarring action rather than a grinding action. Grinding is not desirable, since it tends to break up the individual crystals of gypsum or other precipitate being treated.

The essential feature of this invention is the subjecting of a slurry of wet precipitate to a shattering or jarring action prior to filtration, to cause a substantial reduction in the amount of moisture retained in the cake obtained by filtration of the slurry. In general, a slurry of the original precipitate is charged directly to a suitable hammer mill for treatment. However, it is found in some cases that the action of the hammer mill decreases the filter rate to such an extent that the increased time or filtering tends to offset the savings obtained in the final drying step. This is sometimes the case with precipitated magnesium hydroxide, for example. In such cases, I find it desirable to subject a slurry containing the original relatively coarse precipitate to a preliminary filtration which removes most of the water. The resulting wet filter cake is subjected to the jarring action of a hammer mill, for example, in accordance with the present invention, and is then subjected to a further filtering followed by air blowing to reduce the moisture content to a minimum. It is then dried. In this embodiment of the invention, most of the water is eliminated at the high initial filtering rate, and the final elimination of water during filtering and air blowing is greatly improved by the jarring treatment. This embodiment of the invention includes the jarring action prior to filtration, but it also includes another preliminary filtering step.

In a specific example illustrative of one good mode of practicing the invention and of the results achieved thereby, a wet gypsum precipitate sludge was fed into a hammer mill operated under conditions such that a mild milling action took place with no substantial reduction in the size of the individual crystals. The effluent sludge was fed to a rotary suction filter (so-called vacuum filter) at a rate slow enough to produce maximum extraction of liquid water. The cake leaving the filter averaged 219 pounds water (as wetting liquid) per 1000 pounds gypsum $CaSO_4 \cdot 2H_2O$ (dry basis). It was dried in a continuous hot air drier, to a moisture content of 0 pounds water per 1000 pounds gypsum (same basis). The amount of fuel gas used in this particular drier was 740 cubic feet per ton of the finished product.

For comparison, a batch of similar sludge was fed directly to the same filter, without previous milling, likewise under conditions producing maximum removal of liquid water. The cake leaving the filter averaged 397 pounds water per 1000 pounds gypsum (same basis). It was dried in the same drier, to the same water content. The capacity of the drier was considerably reduced, and an average of 1150 cubic feet of fuel gas was required per ton of product to achieve the specified degree of drying.

In some cases it is desirable to give the gypsum a preliminary coarse filtering treatment prior to milling, to get rid of excess water.

An improvement somewhat less in magnitude, though worth while, is obtained in the case of magnesium silicate sludge processed in a similar way.

The invention makes possible a marked economy in drying hydrated-magnesia precipitates. While the character of precipitated gypsum varies a good deal, magnesia precipitates are fairly uniform and the moisture content of the ordinary filter cake is quite generally equivalent to about 76 per cent $H_2O$ and 24 per cent MgO. In an example illustrative of the results achieved in practicing the invention with magnesium hydroxide filter cakes, a sample of a typical magnesia sludge was diluted to three different densities and a portion of each was passed through a hammer mill under conditions producing a mild breaking down, and was filtered in a suction filter until the point was reached where the cakes cracked, and then dried; all the conditions being carefully controlled. Three of the samples of unmilled diluted sludge were filtered in the same way to the same point, that is, until the cakes cracked. The solid contents of the filter cake, that is to say, the proportion of solids to water, was then determined for each cake. The results are set forth in the tabulation below. In the case of the unmilled sludge, the average value obtained was equivalent to about 24 per cent MgO, or 3.2 grams water per gram MgO, while with the milled sludge, the average value was about 30 per cent MgO or 2.4 grams water per gram MgO. (The product was of course hydrated magnesia, not MgO, but it is customary to express the concentrations of wet hydrated magnesia pastes, etc., in terms of per cent MgO. The cake from the milled sludge dried more rapidly than that from the unmilled sludge and required less heat.

*Solid content of magnesium hydroxide filter cakes obtained from milled and from unmilled sludges*

| Sludge concentration expressed as per cent MgO | Filter cake concentration, milled sludge, per cent MgO | Filter cake concentration, unmilled sludge, per cent MgO |
|---|---|---|
| 13.55 | 29.7 | 23.9 |
| 12.19 | 29.7 | 23.3 |
| 10.84 | 29.8 | 23.5 |

In similar operations carried out under carefully controlled conditions with a gypsum slurry, a batch of slurry was fed through a hammer mill, and then filtered under suction, until no more free water appeared on the top of the cake. The pressure drop across the filter cake when this point was reached was 29 cm. mercury. The cake was analyzed and found to contain 0.147 pound water per pound of $CaSO_4.2H_2O$. By contrast another batch of the same raw slurry, filtered to the same stage without preliminary milling, contained 0.255 pound water per pound of $CaSO_4.2H_2O$. The pressure drop across this cake at the stage mentioned was 20 cm., being relatively low because of the more open texture of the unmilled cake.

The solid material can be washed at any stage, if desired or necessary, before or after the milling. Sometimes the filter cake is washed and again filtered prior to drying. If there are soluble salts present in the mother liquor associated with the solid material, as is generally the case, the amount of the salts in the final product depends on the amount of mother liquor present in the filter cake. In the present invention this proportion of mother liquor is reduced by milling and therefore less washing is required to produce a product of equal purity.

What I claim is:

1. In the method of physically removing liquid from liquid suspensions of clumped solid crystals formed by chemical precipitation, wherein the formation and precipitation of the crystals has been substantially completely effected, said crystals being in such a state of aggregation that the liquids tend to be entrapped therein, the improvement which comprises breaking up the crystal aggregates in such suspension by subjecting the crystal aggregates to a jarring action carried out in an impact beater mill substantially only to a degree wherein clumps of the crystals are disaggregated, and filtering the so-treated suspension to remove liquid therefrom.

2. In the method of physically removing liquids from wet precipitates comprising aggregated solid crystals, wherein the formation and precipitation of the crystals has been substantially completely effected by chemical precipitation, said crystals being in such a state of aggregation that the liquids tend to be entrapped therein, the improvement which comprises breaking up the crystal aggregates in such precipitate by subjecting the crystal aggregates to a jarring action carried out in a hammer mill to a degree wherein the clumps of crystals are disaggregated and mechanically removing the liquid as such from the crystals.

3. In the method of physically removing liquid from an aqueous gypsum slurry, wherein the formation and precipitation of the slurry has been substantially completely effected, the particles of said slurry being in such a state of aggregation that the liquids tend to be entrapped therein, the improvement which comprises breaking up the slurry aggregates in such slurry by subjecting the slurry aggregates to a shattering action carried out in an impact beater mill substantially only to a degree wherein clumps of the aggregates are disaggregated, and mechanically separating liquid, in liquid form, from the so-treated slurry.

4. The method of physically treating completely formed and precipitated liquid suspensions of crystals wherein the solids exist in the form of aggregated particles produced by chemical precipitation, said particles being in such a state of aggregation that the liquids tend to be trapped therein, the improvement which comprises breaking up the aggregated particles in the suspension by subjecting the aggregated particles to a disrupting action carried out in a mill of the type adapted to break up particle aggregates without materially comminuting the constituent particles and mechanically separating the liquid, in liquid form, from the solids.

5. A method as defined in claim 4, wherein the mechanical separation of liquid comprises filtration.

6. The method of claim 4, wherein the disrupting action is given by passage of the said suspension through a hammer mill.

7. The method of claim 4, wherein the suspension comprises an insoluble magnesium compound.

8. The method of claim 4, wherein the suspension comprises a magnesium silicate.

9. The method of claim 4, wherein the suspension comprises magnesia.

10. The method of claim 4, wherein the suspension is given a preliminary filtration to remove water prior to milling.

TEYNHAM WOODWARD.